United States Patent [19]
Kimball

[11] Patent Number: 6,040,703
[45] Date of Patent: Mar. 21, 2000

[54] FIXTURE FOR VIBRATION TESTING

[75] Inventor: David V. Kimball, San Clemente, Calif.

[73] Assignee: Environmental Screening Technology, Inc., Zeeland, Mich.

[21] Appl. No.: 08/962,205

[22] Filed: Oct. 31, 1997

[51] Int. Cl.[7] .................................................. G01R 31/02
[52] U.S. Cl. .......................................... 324/755; 324/754
[58] Field of Search .................................... 324/755, 754, 324/760, 158.1; 439/68, 72

[56] References Cited

U.S. PATENT DOCUMENTS

| | | | |
|---|---|---|---|
| 3,335,327 | 8/1967 | Damon et al. | 439/72 |
| 4,766,371 | 8/1988 | Moriya | 439/68 |
| 5,407,361 | 4/1995 | Ikeya | 439/72 |

*Primary Examiner*—Ernest Karlsen
*Attorney, Agent, or Firm*—Price, Heneveld, Cooper, DeWitt and Litton

[57] ABSTRACT

A testing fixture which facilitates inexpensive, high-speed dynamic testing of electronic devices without subjecting the electrical leads of the devices to damage includes a first carrier plate having a plurality of electrical contacts associated with respective electrical leads of the electronic device which is to be tested, the first carrier plate including electrical conductors electrically connected with the electrical contacts for supplying power to the electronic device and for monitoring signals from the electronic device during testing, and a second carrier plate secured to the first carrier plate, the second carrier plate including abutment surfaces which overlie the electrical contacts on the first carrier plate to retain the electrical leads on the electronic device between the electrical contacts on the first carrier plate and the abutment surfaces on the second carrier plate during testing of the electronic device. At least one of the carrier plates define an aperture in which the electronic device is generally disposed during testing, the aperture having a length and width greater than the length and width of the electronic device, so that contact between the electronic device and the printed circuit board and the clamp plate can be avoided.

17 Claims, 4 Drawing Sheets

FIXTURE FOR VIBRATION TESTING

FIELD OF THE INVENTION

This invention relates to a fixture for testing electronic devices, and more particularly to fixtures for high speed testing of electronic devices under dynamic conditions in which power is supplied to the device being tested and in which the response signals of the electronic device are monitored during testing, such as thermal testing, vibration testing, shock testing, and the like, as well as combinations thereof.

BACKGROUND OF THE INVENTION

Heretofore dynamic testing of electronic devices, such as integrated circuits, has often involved soldering the electronic device to a printed circuit board having electrical contacts and electrical conductors electrically connecting the device to a power source and signal monitoring equipment. For example, in the case of vibrational testing and calibration of accelerometers, the printed circuit board is mounted to a shaker apparatus which is used to vibrate the printed circuit board and subject the device mounted on the printed circuit board to vibrations while it is powered and monitored to analyze the dynamic response of the device. A disadvantage with this method is that it is extremely time consuming, and therefore expensive, to solder an electronic device to a printed circuit board for testing. As a consequence, it is generally not practical to test each device in this manner. Accordingly, such testing, if used, is generally limited to a representative sampling of electronic devices from a production lot thereof. Although such random testing may be acceptable for certain applications in which a certain failure or defect rate can be tolerated, in many applications it is highly desirable, or even of critical importance, that each device be tested and/or calibrated under dynamic conditions to ensure that defective devices are not used. In such circumstances, alternative dynamic testing methods are desired to reduce cost. Another disadvantage with soldering the electronic device directly to a printed circuit board for dynamic testing of the device is that it is difficult to remove the device from the printed circuit board without damaging the pins or electrical leads of the electronic device. As a result, the cost of such testing is further increased on account of the time needed to remove the device from the printed circuit board and on account of the rejection of devices in which the pins or electrical leads are badly damaged. One way of eliminating the need to remove the electronic device from the printed circuit board is to solder the device to the actual printed circuit board on which the device is to be used. This modified technique, however, especially unsuitable is for conducive to high-speed, standardized testing because of the time lost soldering to the printed circuit board any electronic devices which prove to be defective, and because special adapters may be needed for mounting the device on test equipment when the electronic device is to be used on a plurality of different circuit boards of various sizes and shapes. Additional expenses may be associated with removing a defective electronic device from a printed circuit board to which it is soldered if the printed circuit board is reused, or with disposing of printed circuit boards and defective electronic devices attached thereto when the time needed to remove the device is not justifiable. Also, additional transportation costs may be associated with this technique, especially when the mounting of other devices to the printed circuit board is to be completed at another location remote from the location at which testing of the electronic device is to be performed. All of the above problems and associated costs are compounded and increased when a plurality of electronic devices which must be tested are to be mounted to a single circuit board.

Another technique which has been used in an attempt to overcome the problems associated with soldering the electronic device which is to be tested directly onto a printed circuit board is to clamp the electronic device to a circuit board having the appropriate contacts. This technique has involved applying pressure to the body of the electronic device which is to be tested to urge the pins or electrical leads of the electronic device against the appropriate contacts on the circuit board. This technique overcomes some of the problems associated with soldering, to a printed circuit board, the electronic device which is to be subjected to dynamic vibration testing. However, clamping the body of the electronic device introduces unpredictable vibrational distortions to the test system such that the electronic device being tested is not subjected to the same forces as are being applied by the shaker apparatus. As a result, it is not possible to determine the true response of the electronic device to selected vibrational forces provided by the shaker apparatus when using this technique. For many applications the errors associated with vibrational distortion caused by clamping the body of the electronic device to a circuit board are unacceptable. One particular application in which the vibrational distortions caused by clamping the body of the device being tested to a circuit board introduces unacceptable errors involves dynamic vibrational testing of accelerometer devices. In such cases where the precise response of the device to selected vibrational forces is of critical importance, the method of clamping the device to a circuit board by urging the body of the device toward the circuit board is entirely unacceptable. Another disadvantage with this technique is that the clamping forces needed to hold the device being tested on the circuit board during high frequency, high acceleration vibrational testing often cause damage to the pins or electrical leads of the electronic device. A further disadvantage of this technique arises when the electronic device is being tested to determine its dynamic response to vibrational testing at high and/or low temperatures. In such cases, the clamp contacting the body of the device being tested draws heat away from the device during high temperature testing, and supplies heat to the device during low temperature testing, making it impossible, or at least very difficult, to determine the true response of the device to vibrational forces as a function of temperature.

Another technique which has been used for testing of electronic devices, such as integrated circuits, having a body with a plurality of electrical leads emanating therefrom, is to use an apparatus provided with test sockets. The electrical leads of the electronic device which is to be tested are inserted into the sockets of the apparatus. Although use of these types of apparatuses involves less time mounting and demounting the electronic devices being tested than soldering techniques, a substantial amount of time and care must be taken to avoid damage to the electrical leads during mounting and demounting of the electronic device. As a result, the use of test sockets is not amenable to high speed automation. Further, these types of apparatuses having sockets for the electrical leads frequently suffer from loss of electrical contact between the leads of the electronic device and the socket contacts during high frequency, high acceleration vibrational testing. In other words, the electrical contacts between the device under testing and the test socket are not reliable when the test sockets are subjected to high shock and/or vibrational loads. As a result, erroneous test results can occur, which could potentially lead to the use of defective electronic devices and/or the rejection of non-defective electronic devices if the loss of electrical contact is not detected. Even if the loss of electrical contact is detected, such loss of electrical contact will require further testing of the device. Another problem with testing apparatuses having socket connections is that the physical connection between the sockets and the electrical contacts is of the type which tends to introduce unpredictable vibrational distortions, which cause the electronic device to be subjected to vibrational forces which are different from those provided by the shaker apparatus, ultimately resulting in recording of response signals from the device which are not indicative of the true response for the vibrational forces provided by the shaker apparatus. Also, because of the care which must be taken during mounting and demounting of the electronic device which is to be tested to prevent damage to the electrical leads of the electronic device, testing techniques using such apparatuses having sockets adapted to receive the leads of the electronic device which is to be tested are not well suited for high-speed automated testing.

Although the undesirability of soldered connections and socket type connections between electronic devices being tested and test fixtures have been recognized, the concept of clamping or clasping the electrical leads of the electronic device which is being tested between opposing surfaces of plates of a test fixture has not been successfully employed (especially for dynamic shock and vibrational testing) because of difficulty in establishing good electrical contact between all of the electrical leads of the electronic device being tested and the test fixture.

SUMMARY OF THE INVENTION

The test fixtures of the invention facilitate inexpensive, high-speed dynamic testing of electronic devices, without subjecting the electrical leads of the electronic devices being tested to damage, by clasping the electrical leads of the electronic device between carrier plates which are fastened together during testing. The test fixtures of the invention eliminate the need for soldered connections and socket type connections while providing good electrical contact between all of the leads of the electronic device being tested and electrical contacts on the test fixture.

The advantages of the present invention are achieved by a dynamic test fixture comprising first and second carrier plates, a fastener for securely fastening the plates together in a predetermined orientation, with at least one of the carrier plates having a plurality of electrical contacts arranged in a pattern with each of the electrical contacts corresponding with one of the plurality of electrical leads projecting from the electronic device, and at least one of the carrier plates defining an aperture with individually resiliently flexible tabs defined adjacent to the periphery of the aperture, each of the individually flexible tabs corresponding with one of the electrical leads of the electronic device. By disposing each of the electrical contacts of the fixture on an individually resiliently flexible tab, it is possible to securely clasp each of the electrical leads of the device being tested between the carrier plates. The individually flexible tabs insure good electrical contact between the leads of the device being tested and the fixture despite normal variations in the thicknesses of the electrical leads of the electronic device, thus facilitating high-speed testing by clamping the leads of the electronic device being tested between the carrier plates, and relying solely on the clasping of the electrical leads to establish electrical connections between the device being tested and the test fixture and to support the electronic device on the test fixture.

A particular advantage with the test fixtures of this invention is that distortion between a shaker apparatus used for vibrational and/or shock testing of the electronic device being tested is reduced or eliminated because the electronic device being tested is completely supported by clasping the electrical leads between the two carrier plates, thus eliminating unpredictable vibrational distortions which are introduced when the body of the electronic device is separately clamped to the test fixture.

DESCRIPTION OF THE PREFERRED EMBODIMENTS

The expression "dynamic testing" as used herein means measuring the signal response of an electronic device which is being powered and/or being provided with electrical input signals. Such testing may also involve determining the effect that temperature, shock, vibration, etc., or a combination thereof have on the signal response.

Figure 1:
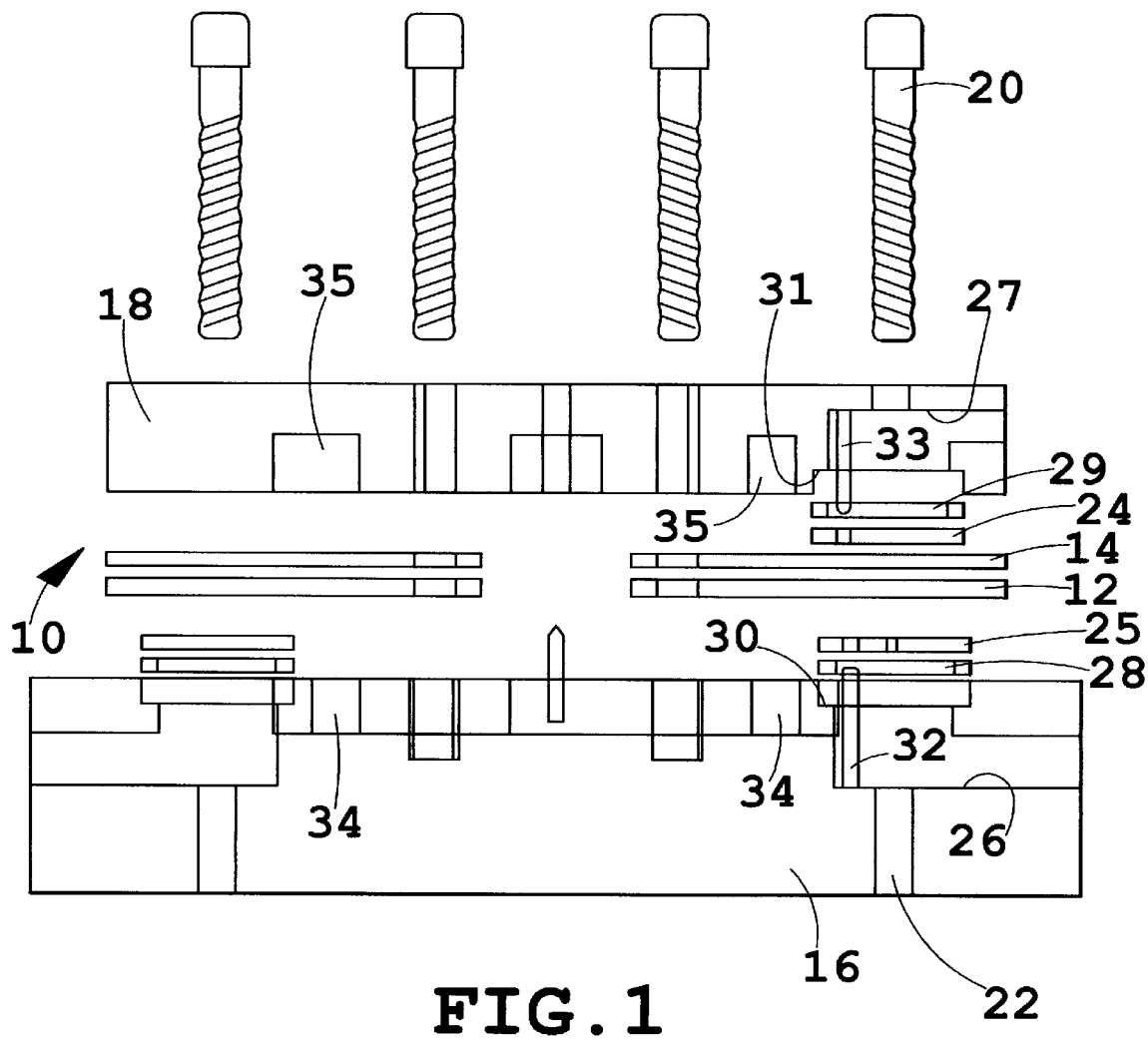
FIG. 1 is an exploded, elevational, cross-sectional view of a vibrational testing system in which an electronic device which is to be tested is mounted between first and second carrier plates in accordance with the principles of the invention.

In FIG. 1, there is shown a dynamic testing system or assembly 10 for testing the signal response of an electronic device under power as it is subjected to test conditions such as shock, high temperatures, low temperatures, and/or high-frequency, high acceleration vibrations such as by a shaker apparatus upon which the assembly is mounted. The fixture for dynamic testing comprises a first carrier plate 12 and a second carrier plate 14 which is locked to the first carrier plate when electronic devices are mounted to the fixture for dynamic testing. The first and second carrier plates are clamped between a mounting plate 16 and a clamping lid 18. The mounting plate 16 and the clamping lid 18 are urged toward each other with bolts 20 having threads which are received in threaded bores 22 of the shaker adapter plate. In the illustrated embodiment, first and second carrier plates 12 and 14 are printed circuit boards, and each includes electrical conductors, electrical contacts for engagement with electrical leads from the electronic device being tested, electrical contacts for engagement with contacts on electrical connectors 24 and 25 which are electrically connected to a power supply and to signal monitoring equipment, and electrical conductors connecting the contacts which engage the leads of the electronic device being tested with the contacts that engage the associated contacts on the electrical connectors 24, 25. Mounting plate 16 and clamping lid 18 include wire ports 26 and 27, respectively, for routing electrical conductors from a power source and signal monitoring equipment to the electrical connectors 24 and 25. Elastomeric compression rings 28, 29 are disposed between annular recessed surfaces 30, 31 and electrical connectors 24, 25, respectively, to ensure good electrical connection between the contacts on carrier plate 14 and the contacts on the electrical connector 24, and between the contacts on carrier plate 12 and the contacts on the electrical connector 25, respectively. Carrier plate 16 and the clamping lid 18 are provided with locating pins 32 and 33, respectively, which pass through alignment apertures defined in the electrical connectors 24, 25 to ensure proper alignment of the electrical connectors with carrier plate 12 and carrier plate 14. The facing surfaces of mounting plate 16 and clamping lid 18 define thermal tunnels 34, 35 which can be used for contacting the electronic device being tested with a heated or chilled fluid (generally air) to facilitate high and/or low temperature testing as desired.

Figure 2:
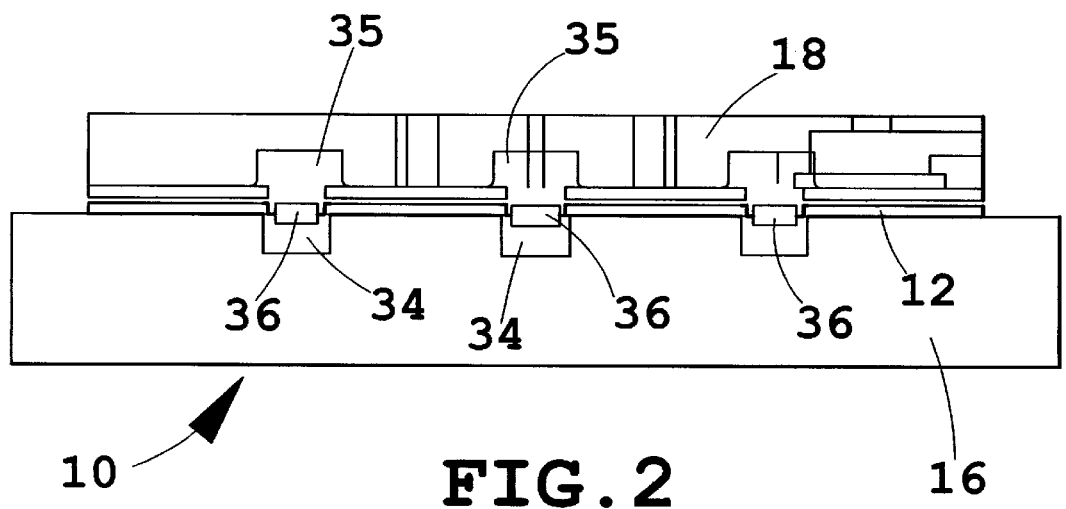
FIG. 2 is an elevational, cross-sectional view of the test system shown in FIG. 1, with the device being tested clamped between first and second carrier plates.

In FIG. 2, there is shown a plurality of electronic devices 36 which are mounted on the fixture comprising carrier plates 12, 14, and in which the fixture is clamped between mounting plate 16 and clamping lid 18. The electronic devices 36 are positioned between thermal tunnels 34 and 35.

Figure 3:
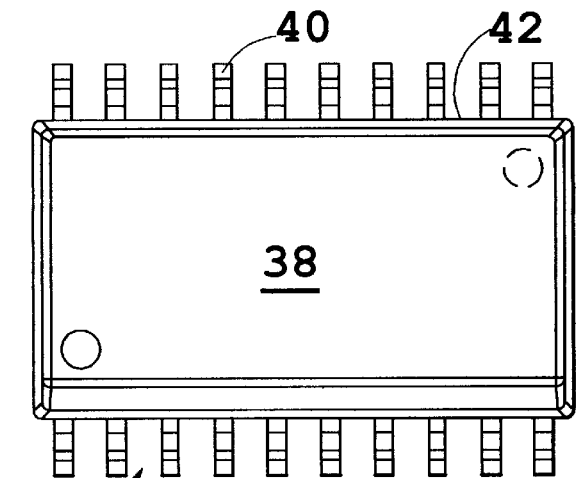
FIG. 3 is a top plan view of an electronic device which may be mounted on the test fixture of this invention and subsequently subjected to dynamic vibrational testing.
Figure 4:
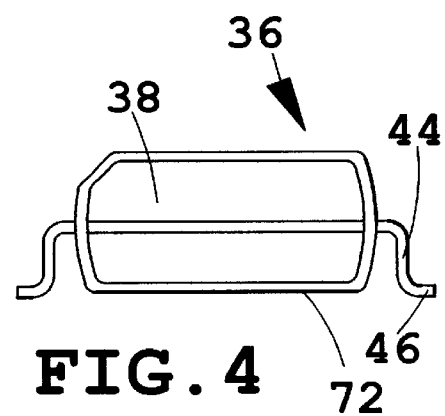
FIG. 4 is an elevational end view of the electronic device shown in FIG. 3.

FIG. 3 shows an electronic device of the type which can be retained by the fixture, comprising carrier plates 12 and 14, for dynamic vibrational testing. Electronic device 36 includes a body 38 and a plurality of pins or electrical leads 40 which project from opposite long sides of body 38. As shown in FIG. 4, each of the leads projects approximately orthogonally outwardly from one of the opposite long sides 42 of body 38 and bends downwardly approximately at a right angle to form leg portions 44, and outwardly at approximately a right angle at the bottom of the leg portion to form a foot portion 46. The illustrated electronic device 36 is an accelerometer having a total of 20 pins, 10 on each side, 10 of which are active.

Figure 6:
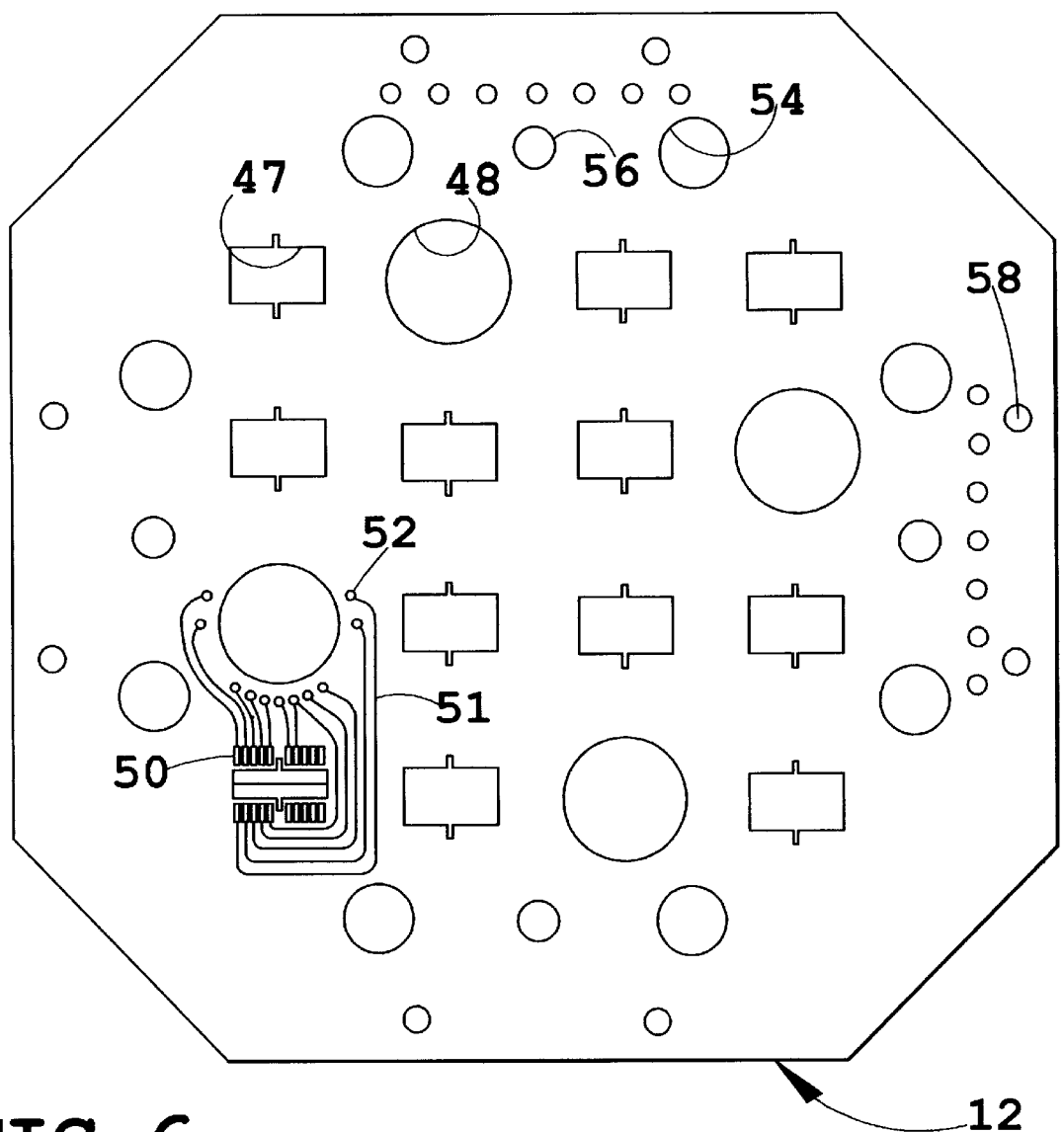
FIG. 6 is a top plan view of a bottom carrier plate which is locked to the carrier plate shown in FIG. 5 to form the fixture for dynamic testing.

A top plan view of carrier plate 12 is shown in FIG. 6. Carrier plate 12 includes a plurality of rectangular shaped apertures 47 in which the electronic devices being tested are generally disposed. Carrier plate 12 also includes a plurality of circular apertures 48 adapted for connection with electrical connectors 25. The length of aperture 47 is greater than the length of the electronic device 36, and the width of the aperture 47 is greater than the width of the electronic device, so that the electronic device can be located in the aperture without contacting body 38. Adjacent each of the long sides of each of the rectangular shaped apertures 47 are a plurality of laterally spaced apart electrical contacts 50, each of which is associated with and adapted to contact one of the electrical leads 40 projecting from body 38 of electronic device 36. Carrier plate 12 also includes electrical conductors 51 electrically connecting contacts 50 with associated contacts 52 which engage contacts on electrical connectors 25. Carrier plate 12 also includes a plurality of circular clearance holes 54 through which bolts 20 pass through when the components of the dynamic testing assembly are in their assembled state. A plurality of alignment apertures 56 are defined by carrier plate 12. Alignment apertures 56 are configured to receive an alignment pin therethrough to ensure proper alignment of carrier plate 12 with carrier plate 14 and various other assembly components. A plurality of handling apertures 58 are also provided for engagement with automated transportation and handling devices for moving the test assembly from a loading station to a test station, from one test station to another test station, and/or from a test station to an unloading station.

Figure 5:
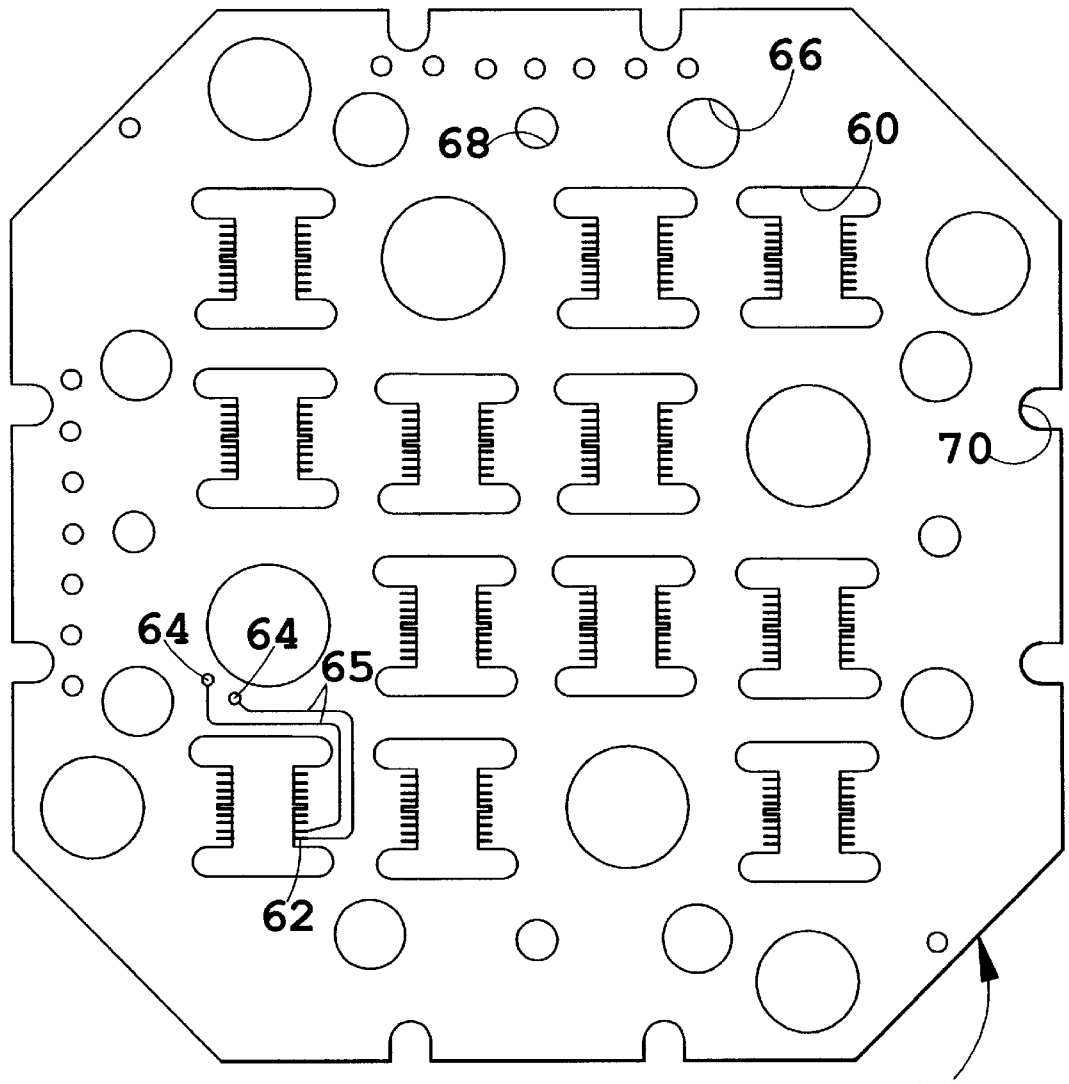
FIG. 5 is a top plan view of a top carrier plate which is used in association with a printed circuit board to provide the fixture for dynamic vibrational testing.

Carrier plate 14, shown in FIG. 5, includes a plurality of apertures 60, each having a length greater than the length of the electronic device 36 being tested, and each having a width greater than the width of the electronic device being tested, so that contact between the carrier plate 14 and the electronic devices 36 is avoided when carrier plates 12 and 14 are locked together to support a plurality of electronic devices 36. Carrier plate 14 includes contacts 62 for engagement with electrical leads 40, contacts 64 for engagement with contacts on electrical connector 24, and electrical conductors 65 electrically connecting contacts 62 with contacts 64. Carrier plate 14 includes a plurality of clearance holes 66 for allowing bolts 20 to pass therethrough, alignment apertures 68 for ensuring alignment of carrier plates 12 and 14, and optionally components of the test assembly, and clearance notches 70 for engagement with transportation and handling pins.

As show in FIG. 2, the electronic devices 36 which are to be tested are located in the rectangular shaped apertures 47 defined by carrier plate 12. As is best illustrated in FIG. 4, foot portions 46 of leads 40 generally extend in a plane coincident with the bottom 72 of body 38 of electronic device 36. Accordingly, to prevent contact between body 36 of electronic device 38 and carrier plates 12 and 14, each of the carrier plates may include apertures 47 and 60, respectively. Also, the provision of apertures 47 and 60 allows fluid (generally air) communication between the electronic device 36 and each of the thermal tunnels 34 and 35. It should be noted however that it is not necessary for both of the carrier plates 12 and 14 to include apertures 47, 60 if electrical leads 40 are sufficiently long so that foot portions 46 are located in a plane below the bottom 72 of body 38 of electronic device 36, and if thermal tunnels 34 and 35 are not both utilized for testing of the electronic device at low or high temperatures.

Figure 8:
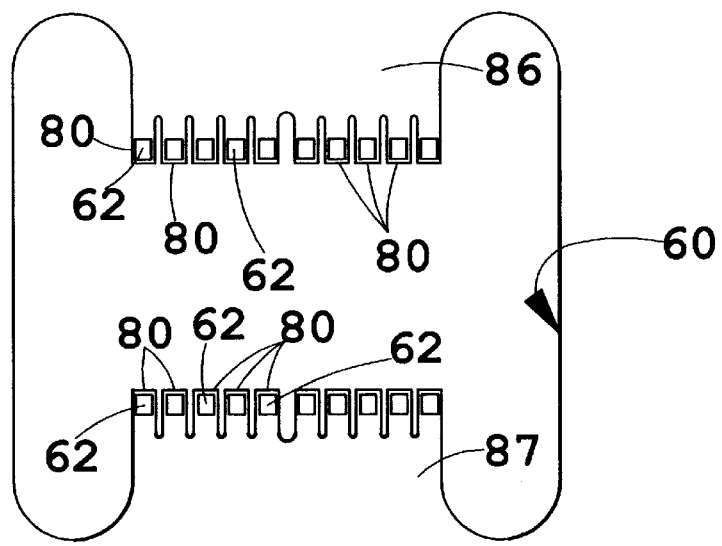
FIG. 8 is an enlarged top plan view of a portion of a carrier plate showing details of aperture defined therethrough.

As shown in FIG. 8, each of the apertures 60 defines a plurality of individually resiliently flexible tabs 80. Disposed on each of the resiliently flexible tabs 80 is an electrical contact 62. Conductors (two of which are indicated by reference numeral 65 in FIG. 5) connect contacts 62 with contacts 64. By disposing electrical contacts 62 on individually resiliently flexible tabs, it is possible to maintain good electrical contact between each of the leads 40 of the electronic device 36 by allowing independent flexing of each of the tabs 80 to compensate for any variations in the thickness of the electrical leads 40. Although the illustrated embodiment includes electrical contacts 50 on carrier plate 12 and electrical contacts 62 on carrier plate 14, each of which engage leads 40 of electronic device 36, it is possible to provide electrical contacts on only one of the carrier plates 12, 14.

Aperture 60 generally defines two resiliently flexible tab portions 86 and 87 on opposite sides of the aperture, with each of two rows of individually resiliently flexible tabs 80 being defined on one of the two resiliently flexible tab portions to allow flexing of each of the rows of resiliently flexible tabs as a unit, as well as individual flexing of each of the resiliently flexible tabs. This arrangement, by allowing flexing of tab portions 86 and 87, reduces the amount of flexural stress imposed upon each of the individually resiliently flexible tabs 80.

Figure 7:
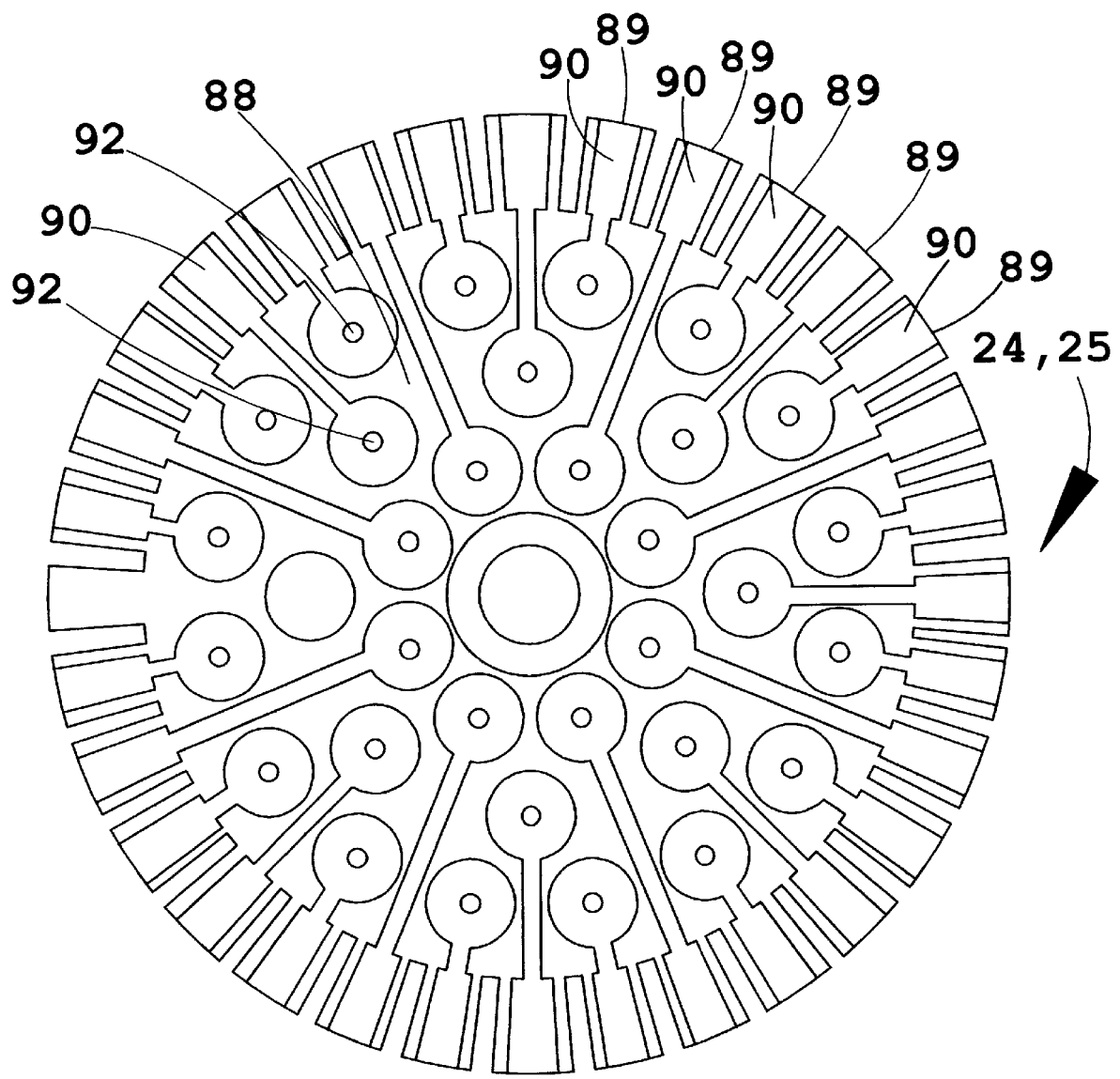
FIG. 7 is a top plan view of an electrical connector for electrically connecting electrical contacts on one of the carrier plates with a power supply and with signal monitoring equipment.

An electrical connector 24, 25 is shown in FIG. 7. The electrical connector comprises a generally disc-shaped plate 88 with a plurality of resiliently flexible connector tabs 89 defined along the periphery of plate 88. Located on each of the resiliently flexible connector tabs is an electrical contact 90. Electrical conductors, such as wires, can be soldered to connectors 24, 25 at locations 92, each of which is connected to a respective one of contacts 90. Elastomeric members 28, 29 (FIG. 1) urge each of the resiliently flexible tabs 89 and the electrical contacts 90 disposed thereon into contact with contacts 52 located on carrier plate 12.

Carrier plates 12, 14 and connectors 24, 25 are preferably formed of a dielectric material such as plastic. Carrier plates 12, 14 and connectors 24, 25 are preferably formed of a thermoset resin, more preferably an epoxy resin, and are preferably glass fiber reenforced. A particularly suitable commercially available material is a standard printed circuit board material designated as "G10". G10 printed circuit board material is an epoxy resin material reenforced with woven glass fibers. The carriers 12, 14 are preferably made of a very strong material capable of withstanding high bending loads without failure, and must be sufficiently flexible to allow flexing at the resiliently flexible tabs to compensate for variations in the thicknesses of the leads 40 of the device being tested.

With the illustrated embodiment, both carrier plates 12 and 14 are actually printed circuit boards including electrical contacts and electrical conductors. However, it is possible that only one of the carrier plates be a printed circuit board.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

What is claimed is:

1. A fixture for dynamic testing of an electronic device having a body and a plurality of electrical leads projecting therefrom, comprising:

first and second dielectric carrier plates;

a fastener for securely fastening the first and second carrier plates together in a predetermined orientation without engaging the body of the electronic device;

at least one of the carrier plates having a plurality of electrical contacts thereon, the plurality of electrical contacts being arranged in a pattern with each of the plurality of electrical contacts corresponding with one of the plurality of electrical leads projecting from the body of the electronic device; and at least the first carrier plate defining an aperture with a plurality of individually resiliently flexible tabs being defined adjacent the periphery of the aperture, each of the individually flexible tabs corresponding with one of the electrical leads of the electronic device, whereby each of the electrical leads of the electronic device is capable of being securely clasped between one of the resiliently flexible tabs along the periphery of the aperture defined by the first carrier plate and the second carrier plate, and whereby each of the electrical leads of the electronic device is capable of being electrically connected with a corresponding electrical contact on at least one of the carrier plates.

2. The fixture of claim 1, wherein both of the carrier plates include a plurality of electrical contacts thereon, the plurality of electrical contacts on each of the carrier plates being arranged in a pattern so that each of the electrical contacts on each of the carrier plates corresponds with one of the plurality of electrical leads projecting from the body of the electronic device, whereby each of the electrical leads of the electronic device is electrically connected with a corresponding electrical contact on each of the carrier plates when the electrical leads are clasped between the first and second carrier plates.

3. The fixture of claim 1, wherein the fixture is adapted for dynamic testing of an electronic device having two opposite sides and a plurality of electrical leads projecting from each of the opposite sides, the plurality of electrical contacts being arranged in two generally parallel rows on the first carrier plate, and the plurality of individually resiliently flexible tabs being defined along the periphery of an aperture through the second carrier plate and being arranged into generally parallel rows, whereby each of the plurality of electrical leads of the electronic device is capable of being clasped between one of the resiliently flexible tabs on the second carrier plate and one of the electrical contacts on the first carrier plate.

4. The fixture of claim 3, wherein the aperture through the second carrier plate defines two resiliently flexible tab portions on opposite sides of the aperture, with each of the two rows of individually resiliently flexible tabs being defined on one of the two resiliently flexible tab portions to allow flexing of each of the rows of resiliently flexible tabs as a unit, as well as individual flexing of each of the resiliently flexible tabs.

5. The fixture of claim 1, wherein at least a first one of the carrier plates includes electrical testing contacts for supplying power to the electronic device and for monitoring an output signal from the electronic device, and wherein the first carrier plate includes electrical conductors for connecting the electrical contacts corresponding with the electrical leads of the electronic device to the electrical testing contacts, and wherein the fixture further comprises an electrical connector and mounting plate to which the carrier plates are secured, the electrical connector being disposed between the first carrier plate and the mounting plate, the electrical connector comprising a dielectric plate having a plurality of individually resiliently flexible connector tabs defined along the periphery thereof, a plurality of electrical connector contacts disposed on the electrical connector, each of the electrical connector contacts being located on one of the plurality of resiliently flexible connector tabs, and an elastomeric member disposed between the first carrier plate and the mounting plate and generally overlying the resiliently flexible connector tabs, the elastomeric member urging the resiliently flexible tabs and electrical connector contacts into contact with the testing contacts on the first carrier plate.

6. The fixture of claim 5, wherein the electrical connector is a generally circular shaped disk, and wherein the resiliently flexible connector tabs and electrical connector contacts are radially disposed along the circular periphery of the electrical connector, and wherein the elastomeric member is a circular ring having an outer diameter approximately equal to an outer diameter of the circular shaped electrical connector.

7. The fixture of claim 1, wherein the carrier plates are formed of a plastic material.

8. The fixture of claim 7, wherein the plastic material is a thermoset resin.

9. The fixture of claim 8, wherein the thermoset resin is an epoxy resin.

10. The fixture of claim 1, wherein the carrier plates are formed of a glass fiber reinforced plastic material.

11. The fixture of claim 10, wherein the plastic material is a thermoset resin.

12. The fixture of claim 11, wherein the thermoset resin is an epoxy resin.

13. A fixture for dynamic testing an electronic device having a body and electrical leads projecting from the body, comprising:

a first carrier plate having a plurality of electrical contacts associated with respective electrical leads of the electronic device which is to be tested, the first carrier plate including electrical conductors electrically connected with the electrical contacts for supplying power to the electronic device and for monitoring signals from the electronic device during testing;

a second carrier plate secured to the first carrier plate, the second carrier plate including surfaces which overlie the electrical contacts on the first carrier plate, whereby the electrical leads of the electronic device may be retained between the electrical contacts on the first carrier plate and the surfaces of the second carrier plate which overlie the electrical contacts during testing of the electronic device;

a fastener for securely fastening the first and second carrier placed together in a predetermined orientation, the fastener including a mounting plate over which the first and second carrier plates are disposed, a clamping lid disposed over the first and second carrier plates, and a plurality of bolts urging the mounting plate and clamping lid together and securely retaining the first and second carrier plates between the mounting plate and the clamping lid; and at least one of the carrier plates defining an aperture in which the electronic device is generally disposed during testing, the aperture having a length which is greater than a length of the electronic device and a width which is greater than a width of the electronic device, whereby the body of the electronic device is spaced away from the carrier plates, and whereby the electronic device is retained on the fixture exclusively by clamping of the electrical leads of the electronic device between the first carrier plate and the second carrier plate.

14. The fixture of claim 13, wherein both of the carrier plates include a plurality of electrical contacts thereon, the plurality of electrical contacts on each of the carrier plates being arranged in a pattern so that each of the electrical contacts on each of the carrier plates corresponds with one of the plurality of electrical leads projecting from the body of the electronic device, whereby each of the electrical leads of the electronic device is electrically connected with a corresponding electrical contact on each of the carrier plates when the electrical leads are clasped between the first and second carrier plates.

15. The fixture of claim 13, wherein at least a first one of the carrier plates includes electrical testing contacts for supplying power to the electronic device and for monitoring an output signal from the electronic device, and wherein the first carrier plate includes electrical conductors for connecting the electrical contacts corresponding with the electrical leads of the electronic device to the electrical testing contacts, and wherein the fixture further comprises an electrical connector and mounting plate to which the carrier plates are secured, the electrical connector being disposed between the first carrier plate and the mounting plate, the electrical connector comprising a dielectric plate having a plurality of individually resiliently flexible connector tabs defined along the periphery thereof, a plurality of electrical connector contacts disposed on the electrical connector, each of the electrical connector contacts being located on one of the plurality of resiliently flexible connector tabs, and an elastomeric member disposed between the first carrier plate and the mounting plate and generally overlying the resiliently flexible connector tabs, the elastomeric member urging the resiliently flexible tabs and electrical connector contacts into contact with the testing contacts on the first carrier plate.

16. The fixture of claim 15, wherein the electrical connector is a generally circular shaped disc, and wherein the resiliently flexible connector tabs and electrical connector contacts are radially disposed along the circular periphery of the electrical connector, and wherein the elastomeric member is a circular ring having an outer diameter approximately equal to an outer diameter of the circular shaped electrical connector.

17. The fixture of claim 1, wherein the fastener comprises a mounting plate over which the first and second carrier plates are disposed, a clamping lid disposed over the first and second carrier plates, and a plurality of bolts urging the mounting plate and clamping lid together and securely retaining the first and second carrier plates between the mounting plate and the clamping lid.

* * * * *